May 26, 1931.                    M. C. SUPAN                    1,807,351
                                    JACK
                              Filed Oct. 5, 1927
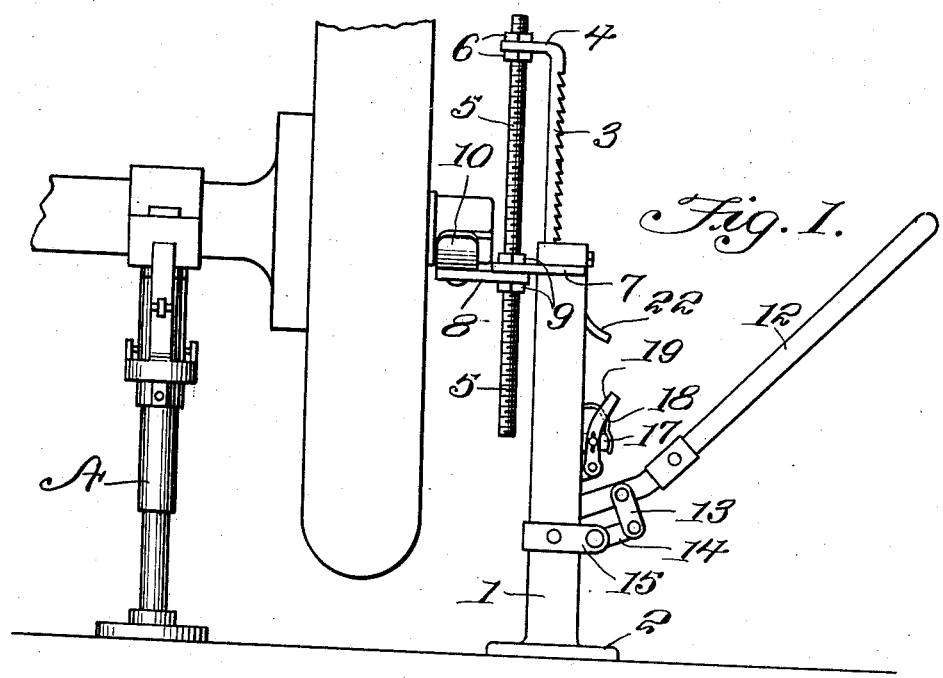
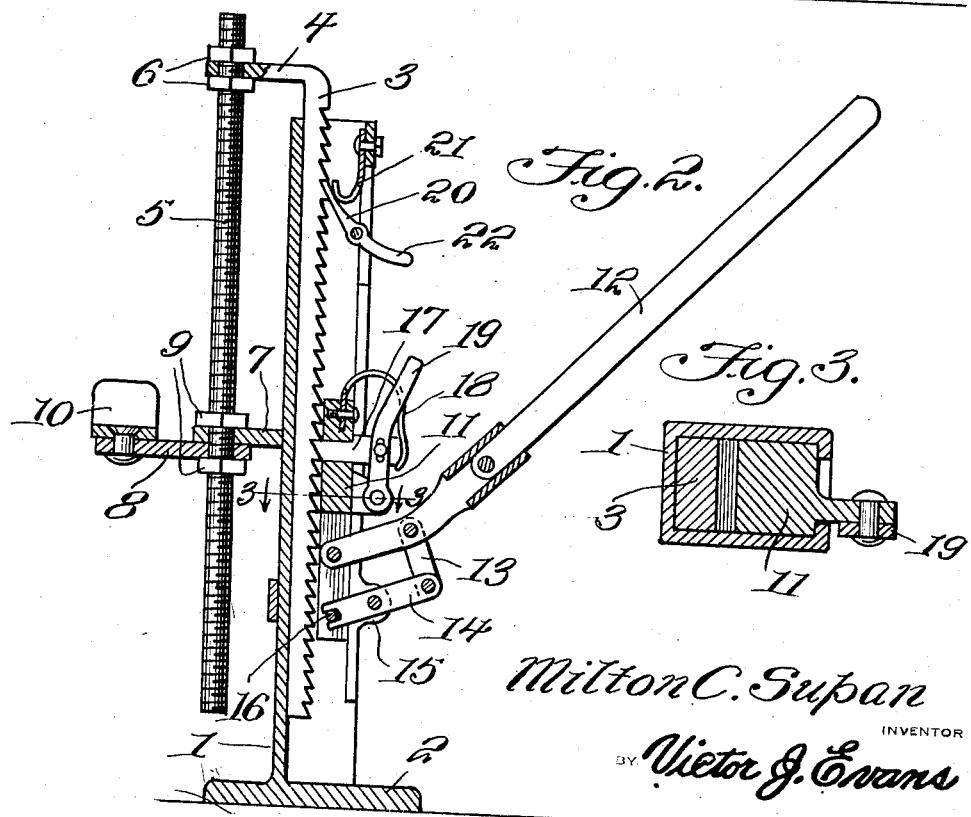
Milton C. Supan
INVENTOR
by Victor J. Evans
ATTORNEY Patented May 26, 1931

1,807,351

UNITED STATES PATENT OFFICE

MILTON C. SUPAN, OF MINERAL, CALIFORNIA

JACK

Application filed October 5, 1927. Serial No. 224,238.

This invention relates to a jack, the general object of the invention being to provide an easily operated jack which can be used on the hub cap of a vehicle to lift the wheel off the ground so that the supporting post, forming the subject matter of an application filed concurrently herewith, can be moved into supporting position to permanently support the wheel off the ground, after which the jack can be moved to raise another wheel.

A further object of the invention is to provide means whereby the hub cap engaging member can be adjusted to suit vehicles of different kinds.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the jack in use with the wheel raised and a supporting post swung into operative position.

Figure 2 is a longitudinal sectional view through the jack.

Figure 3 is a section on line 3—3 of Figure 2.

In these views, 1 indicates a vertically arranged casing-like body of the jack which is provided with the base part 2 and in which is slidably arranged a rack bar 3 having its upper end bent at right angles, as shown at 4. This part 4 carries a threaded rod 5 and this rod passes through a hole in the part 4 and is adjustably held in position by the nuts 6 placed one on each side of the part 4. A yoke 7 and an arm 8 are also adjustably fastened to the rod 5 by the nuts 9. The yoke slidingly engages the body. The arm 8 carries a curved cross piece or shoe 10 which is adapted to engage the part to be lifted.

A slide 11 is arranged in the body 1, said body being slotted at its front and a handle 12 is pivoted to the slide and is connected by the links 13 to a short lever 14 which is pivoted between the ears 15 on the body and has a notch in its inner end which engages a pin 16 on the slide. Thus by moving the handle downwardly, the slide will be moved upwardly and by moving the handle upwardly, the slide will be moved downwardly. A pawl or dog 17 is slidably carried by the upper part of the slide and is normally held in engagement with the teeth of the rack bar 3 by a spring 18. A small handle 19 is pivoted to the slide and is connected with the pawl in such a manner that when the handle 19 is moved outwardly, the pawl will be retracted. A dog 20 is pivoted in the body adjacent the upper end thereof and is normally held by a spring 21 in engagement with the teeth of the rack bar 3. This pawl is provided with a handle 22.

From the foregoing it will be seen that by depressing the handle, the slide will be raised and as the pawl 17 is in engagement with one of the teeth of the rack bar, the rack bar will be caused to move with the slide. In this action, the pawl 20 will ratchet over the rack bar and thus hold the rack bar in its adjusted position. When the handle has been moved to its full extent, it is reversed and moved back to its original position, the pawl 17 ratcheting over the teeth of the rack bar in this downward movement of the slide. Then the handle is moved downwardly again to move the slide and the rack bar upwardly again and this action is continued until the article engaged by the jack has been lifted the desired extent.

When the jack is to be lowered, the handle is lowered slightly to cause the pawl carried by the slide to slightly lift the rack bar to remove the strain off the pawl 20. Then the pawl 20 is moved out of engagement with the rack bar by depressing its handle 22 and then the main handle is pulled upwardly so as to lower the slide to permit the rack bar to move downwardly. The pawl 20 is then engaged with the rack bar again and the handle 19 pulled outwardly to release the pawl 17 so that the slide can be moved upwardly to permit the pawl 17 to secure a new grip on the rack bar. Then the pawl 20 is released again from the rack bar and the handle 12 moved downwardly to lower the rack bar another step. This operation is continued until the wheel or other article rests upon the ground. When the rack bar is to be lowered in one operation, both pawls are retracted by their handles so that the rack bar can drop to its lowest position. By making the arm 8 adjustable, the shoe 10 can be positioned to engage articles of different heights.

Figure 1 shows the jack as being used to lift a wheel off the ground so that a post A, such as described in my companion application filed concurrently herewith can be swung downwardly to support the wheel in raised position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A jack comprising a substantially rectangular body, a rack bar slidably arranged within the body and terminating to provide an offset apertured extremity at its upper end, manually operated means for raising and lowering the rack bar, a threaded rod having its upper end received by the aperture of said offset extremity, nuts arranged above and below the extremity and associated with the rod to support the latter, said rod being arranged exteriorly of the jack body and in spaced parallel relation thereto, a yoke slidably mounted upon the rod and extending in the direction of the jack body, and arranged to straddle the latter, a shoe supporting plate slidable on said rod and projecting in an opposite direction from the yoke, the adjacent ends of said yoke and plate being arranged in superposed relation on said rod, and nuts threaded on said rod above and below the yoke and plate for holding the parts in a given adjusted position.

In testimony whereof I affix my signature.

MILTON C. SUPAN.